J. R. KUNZELMAN.
STEERING GEAR FOR MOTOR DRIVEN VEHICLES.
APPLICATION FILED NOV. 26, 1915.
1,209,728.
Patented Dec. 26, 1916.
2 SHEETS—SHEET 1.
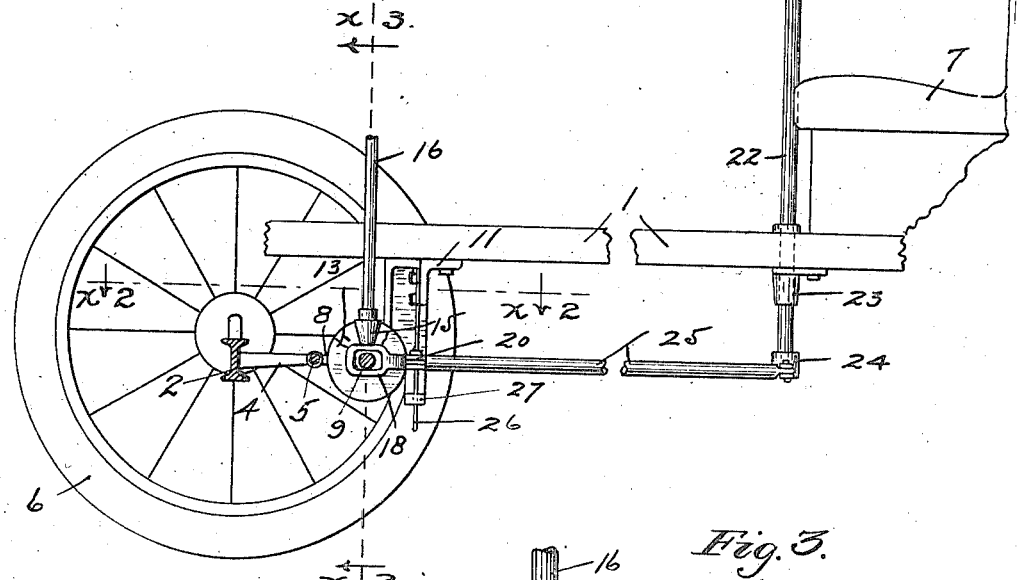
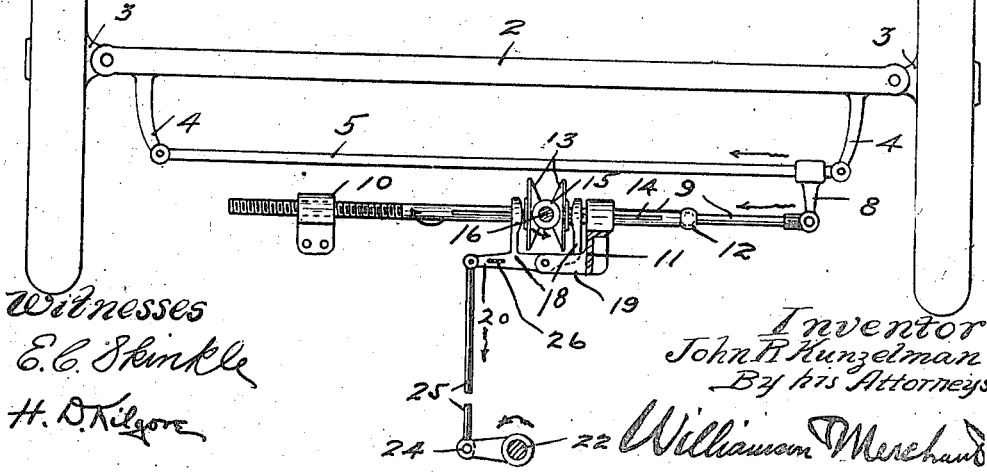
Witnesses
E. C. Skinkle
H. D. Kilgore
Inventor
John R. Kunzelman
By his Attorneys

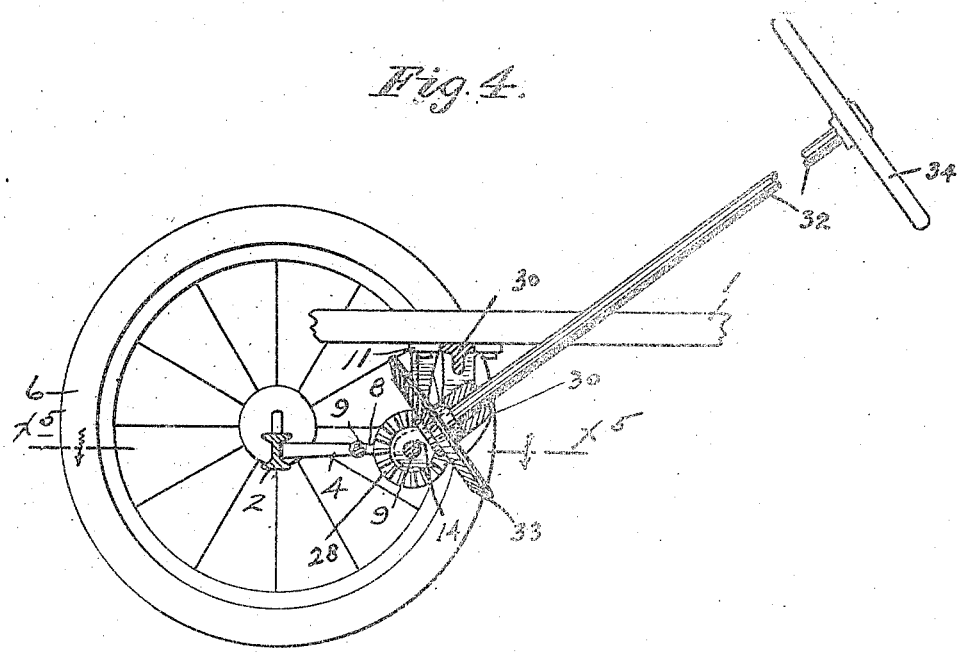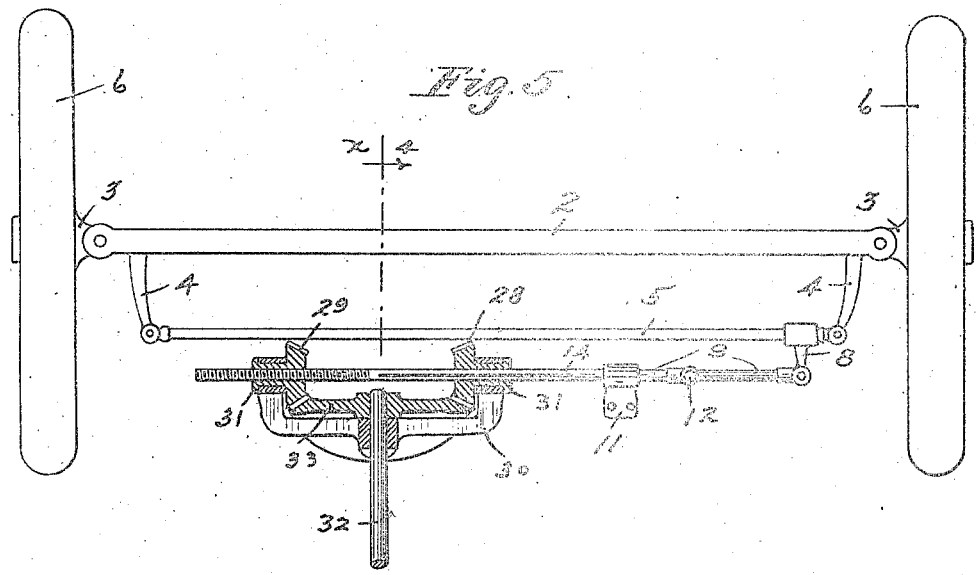

UNITED STATES PATENT OFFICE.

JOHN R. KUNZELMAN, OF DULUTH, MINNESOTA.

STEERING-GEAR FOR MOTOR-DRIVEN VEHICLES.

1,209,728.

Specification of Letters Patent.   Patented Dec. 26, 1916.

Application filed November 26, 1915. Serial No. 63,422.

*To all whom it may concern:*

Be it known that I, JOHN R. KUNZELMAN, a citizen of the United States, residing at Duluth, in the county of St. Louis and State of Minnesota, have invented certain new and useful Improvements in Steering-Gear for Motor-Driven Vehicles; and I do hereby declare the following to be a full, clear, and exact description of the invention, such as will enable others skilled in the art to which it appertains to make and use the same.

My invention relates to improvements in steering-gear for motor driven vehicles; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a fragmentary view, partly in side elevation and partly in longitudinal vertical section of an automobile having incorporated therein one form of the improved steering-gear; Fig. 2 is a plan view of the parts shown in Fig. 1, with some parts removed and some parts sectioned on the line $x^2$ $x^2$ of Fig. 1; Fig. 3 is a fragmentary detail view, partly in elevation and partly in longitudinal vertical section taken on the line $x^3$ $x^3$ of Fig. 1; Fig. 4 is a view corresponding to Fig. 1, but showing another form of the improved steering-gear, some parts being sectioned on the line $x^4$ $x^4$ of Fig. 5; and Fig. 5 is a plan view of the parts shown in Fig. 4, with some parts removed and some parts sectioned on the line $x^5$ $x^5$ of Fig. 4.

Of the parts of the vehicle illustrated, it is important to note the frame 1, rigid front axle 2, stub axles 3 pivoted to the axle 2 and having rearwardly and horizontally projecting arms 4, tie rod 5 connecting the arms 4, front wheels 6 journaled on the stub axles 3, and seat 7 mounted on the frame 1. The parts, thus far described, may be of the standard or of any desired construction.

Referring, first, to the invention, as illustrated in Figs. 1, 2 and 3, the numeral 8 indicates an arm rigidly secured to the right hand end of the tie rod 5. To the free end of this arm 8, is pivotally secured one end of a steering rod 9. Of course, the steering rod 9 may be secured directly to one of the arms 4 or an extension thereof. The other end of the steering rod 9 has screw-threaded engagement with the heavy nut block 10 rigidly bolted to the frame 1. The steering rod 9 extends transversely of the vehicle, parallel to the tie rod 5 and at its intermediate portion is journaled to a depending bracket 11, also rigidly secured to the frame 1. As the steering rod 9 is secured in part to the frame 1 and in part to the front axle 2, it is necessary to provide the same with a ball and socket joint 12 to permit yielding movement thereof, in view of the fact that the frame 1 is supported on the front axle 2. This ball and socket joint 12 is located between the pivoted end of the steering rod 9 and the bracket 11.

Mounted on the steering rod 9, between the nut block 10 and the bracket 11, is a pair of friction bevel gears 13 integrally formed, one with the other, and having their beveled faces opposed one to the other. The steering rod 9 is free for longitudinal sliding movement through the bevel gears 13, but is held for rotation therewith by a long key 14. Extending between the bevel gears 13, is a bevel friction pinion or cone 15 secured to a motor driven shaft 16, journaled in a bearing 17 on the bracket 11. This shaft 16 may be driven directly from the motor of the vehicle, not shown, or from a moving part driven by said motor.

Either one of the gears 13 is moved, at will, into and out of mesh with the pinion 15, depending on which way it is desirous of rotating the steering rod 9; and hence, to steer the vehicle. To shift the gears 13 into and out of mesh with the pinion 15, is provided a shipper lever 18 in the form of a yoke with its intermediate portion pivoted to an extension 19 on the bracket 11. The prongs of the shipper lever 18 are provided with apertures, through which the steering rod 9 projects, and they embrace the bevel gears 13, as best shown in Fig. 2. Integrally formed with the intermediate portions of the shipper lever 18, is a lever extension 20.

The shipper lever 18 is operated to shift the gears 13 by a hand piece 21 secured to the upper end of a shaft 22, extended vertically through the frame 1, just in front of the seat 7, and journaled in a bearing 23 secured to said frame. Rigidly secured to the lower end of the shaft 22, is an arm 24 connected to the lever extension 20 by a link 25. The gears 13 are held in a neutral position by a flat spring 26, extended transversely through the lever extension 20. The upper end of this spring 26 is rigidly secured to the bracket 11 and the lower end thereof extends loosely through an extension 27 on the bracket 11.

The operation of the motor driven steering-gear, shown in Figs. 1, 2 and 3 and just described, may be briefly stated as follows: With the motor driven shaft 16 rotating in the direction of the arrow marked on Fig. 2, the hand piece 21 is moved to the right, when it is desirous of steering the vehicle in a like direction. This movement of the hand piece 21 will shift the right hand gear 13 into frictional contact with the pinion 21, causing the steering rod 9 to rotate in the ball and socket joint 12 and nut block 10, in the direction of the arrow marked on Fig. 2. As the nut block 10 is anchored to the frame 1, the steering rod 9 will move longitudinally in the direction of the arrow marked in Fig. 2, and thus impart an angular steering movement to the wheels 6, in a direction to cause the vehicle to turn to the right. As long as the hand piece 21 is held in this position, the vehicle will continue to move to the right. When the hand piece 21 is released, the spring 26 will move the gears 13 into a neutral position and the vehicle continue to run in the same direction as set. To steer the vehicle to the left, the movements will be just the reverse from those described. As the steering rod 9 and nut block 10 positively lock the wheels 6 to the frame 1 in steering position, it is impossible to lose control of the vehicle, in case the wheels should strike an obstruction, such as a stone, rut or loose material in the roadbed.

Referring now to the hand-actuated steering-gear, illustrated in Figs. 4 and 5, the elements 1 to 9, inclusive, 11, 12 and 14 are identical, or substantially so, with like elements illustrated in Figs. 1 to 4, inclusive. The steering rod 9 is rotated, either to the left or right and moved longitudinally by a pair of opposed bevel gears 28 and 29 on the steering rod 9. The gear 28 is held by the key 14 for rotation with the steering rod 9, but with freedom to slide thereon, and the gear 29 has screw-threaded engagement with said steering rod. The hubs of the gears 28 and 29 are journaled in the prongs of a yoke-like bearing 30 and are held against axial removal therefrom by collars 31 on said hubs. The bracket 30 is rigidly secured to the frame 1 and one end of an upwardly and rearwardly inclined steering post 32 is journaled in the intermediate portion thereof. To the lower end of the post 32, is rigidly secured a bevel gear 33, with which the bevel gears 28 and 29 mesh at diametrically opposite points. To the upper end of the steering post 32 is rigidly secured a hand wheel 34. Obviously, by turning the hand wheel 34, the gears 28 and 29 may be rotated to impart angular steering movements to the wheels 6, in the same manner as in the construction illustrated in Figs. 1 to 3, inclusive. It is important to note that by using the two gears 28 and 29, the steering rod 9 is moved endwise at twice the speed as one of said gears would move the same.

By the use of either of the above described steering-gears, a vehicle may be set to run in a given direction and will continue to so run, until again changed, thus leaving the operator's hands free.

While the invention is shown applied to an automobile, it is, of course, understood that the same may be used in connection with flying-machines.

What I claim is:—

1. The combination with a motor driven vehicle having steering elements, of a rotatable steering rod secured with respect to the steering elements, a stationary nut block having screw-threaded engagement with said steering rod, a gear keyed to the steering rod and through which said steering rod is free to slide longitudinally, a pinion secured against radial movement, means for driving the pinion, and means for sliding the gear on the steering rod into and out of operative engagement with said pinion.

2. The combination with a motor driven vehicle having steering elements, of a rotatable steering rod secured with respect to the steering elements and having a knuckle joint, a stationary nut block having screw-threaded engagement with said steering rod, a gear keyed to the steering rod and through which said steering rod is free to slide longitudinally, a pinion secured against radial movement, means for driving the pinion, and means for sliding the gear on the steering rod into and out of operative engagement with said pinion.

3. The combination with a motor driven vehicle having steering elements, of a rotatable steering rod secured with respect to said steering elements, a stationary nut block having screw-threaded engagement with said steering rod, a pair of gears keyed to the steering rod and through which said steering rod is free to slide longitudinally, a pinion secured against radial movement, means for driving the pinion, and means for moving either of said gears, at will, into operative engagement with said pinion.

4. The combination with the chassis of a motor driven vehicle having a rigid front axle, arm-equipped stub axles pivoted to said rigid axle, wheels journaled on said stub axles, and a tie rod connecting the arms of said stub axles, of a rotatable steering rod secured in respect to said tie rod, a stationary nut block secured to said chassis and having screw-threaded engagement with said steering rod, a pair of bevel gears keyed to said steering rod and through which said steering rod is free to slide longitudinally, an engine driven pinion, and means for moving either of said gears, at will, into operative engagement with said pinion.

5. The combination with the chassis of a motor driven vehicle having a rigid front axle, arm-equipped stub axles pivoted to said rigid axle, wheels journaled on said stub axles, and a tie rod connecting the arms of said stub axles, of a steering rod secured in respect to said tie rod, a nut block secured to said chassis and having screw-threaded engagement with said steering rod, a pair of bevel gears keyed to said steering rod and through which said steering rod is free to slide longitudinally, an engine driven pinion, yielding means tending to hold said pinion in a neutral position, and means for moving either of said gears, at will, into operative engagement with said pinion.

6. The combination with the chassis of a motor driven vehicle having a rigid front axle, arm-equipped stub axles pivoted to said rigid axle, wheels journaled on said stub axles, and a tie rod connecting the arms of said stub axles, of a steering rod secured in respect to said tie rod, a nut block secured to said chassis and having screw-threaded engagement with said steering rod, a pair of friction gears keyed to said steering rod and through which said steering rod is free to slide longitudinally, an engine driven friction pinion, yielding means tending to hold said pinion in neutral position, and means for moving either of said gears, at will, into frictional contact with said pinion.

In testimony whereof I affix my signature in presence of two witnesses.

JOHN R. KUNZELMAN.

Witnesses:
 GEO. S. MALESKI,
 EMIL A. RUF.